United States Patent [19]

Hoffman

[11] 4,406,748
[45] Sep. 27, 1983

[54] LIQUID PURIFICATION SYSTEM

[76] Inventor: Frank W. Hoffman, 101 Mulberry St., Springfield, Mass. 01105

[21] Appl. No.: 305,892

[22] Filed: Sep. 25, 1981

[51] Int. Cl.³ .............................................. B01D 3/02
[52] U.S. Cl. .................................... 202/233; 62/124; 203/10; 203/21; 203/DIG. 17
[58] Field of Search ................ 62/124, 532, 537, 540, 62/541; 203/10, 11, 91, DIG. 17, 21, 22, 23, 25, 27, 94; 202/205, 233–235

[56] References Cited

U.S. PATENT DOCUMENTS

| 2,975,107 | 3/1961 | Friedman . |
| 3,206,380 | 9/1965 | Daviau . |
| 3,211,633 | 10/1965 | Hammer et al. . |
| 3,214,349 | 10/1965 | Kehoe et al. . |
| 3,214,352 | 10/1965 | Wells . |
| 3,219,555 | 11/1965 | Poindexter et al. . |
| 3,220,203 | 11/1965 | Rose . |
| 3,236,746 | 2/1966 | Poindexter et al. . |
| 3,275,532 | 9/1966 | Harper . |
| 3,288,685 | 11/1966 | Kemper et al. . |
| 3,312,600 | 4/1967 | Morton . |
| 3,350,279 | 10/1967 | Tolchin . |
| 3,443,393 | 5/1969 | Goldberg ............................. 62/124 |
| 3,450,601 | 6/1969 | Brown . |
| 3,454,471 | 7/1969 | Kehoe . |
| 3,486,985 | 12/1969 | McGrath . |
| 3,575,814 | 4/1971 | Bahrenburg . |
| 3,674,652 | 7/1972 | Brown . |
| 4,046,637 | 9/1977 | Sasaki . |
| 4,075,063 | 2/1978 | Tsay et al. . |
| 4,181,577 | 1/1980 | Foley . |
| 4,209,364 | 6/1980 | Rothschild . |
| 4,295,333 | 10/1981 | Camirand et al. . |
| 4,305,382 | 12/1981 | Nott . |

Primary Examiner—Frank Sever
Attorney, Agent, or Firm—George P. Hoare, Jr.

[57] ABSTRACT

A liquid purification system, method and apparatus includes a plurality of operationally interconnected chambers. A supply or inlet chamber is held at about atmospheric temperature while other chambers of the system are held at a partial vacuum. The liquid to be purified is metered through a pressure differential between the supply or first chamber and a second chamber to induce spontaneous vaporization of the liquid. The temperatures of the chambers are reduced sufficiently so that, in the case of water, temperature-pressure conditions in the second chamber are below the triple point so as to condense ice and precipitate impurities into another chamber from the spontaneous vaporization. Condensation of the vapor in still another chamber recovers pure liquid. A temperature differential mechanism operatively connected to the chambers insures that condensation of the vapor will occur.

11 Claims, 6 Drawing Figures

LIQUID PURIFICATION SYSTEM

BACKGROUND OF THE INVENTION

This invention relates to the separation of an impurity from a liquid and, more particularly, to the separation of the solvent and solute of a solution by an induced phase change.

The separation of impurities from a liquid, as in the purification of water, is used in numerous industrial processes. Various systems exist for the purification of water. An exemplary case is the desalinization of sea water which is important for human health. The operation of desalination systems may involve the boiling and freezing of sea water, as well as the use of vacuum pumps in reducing the ambient pressure on the water to facilitate the production of water vapor. At present, two common methods for desalination are distillation and reverse osmosis, with a third process, freezing, not commercially in use.

The distillation process suffers from major drawbacks, particularly, high corrosion and high energy consumption. In the distillation process, the seat water must be heated and, accordingly, energy is consumed in large quantities and elaborate means must be used to recover as much heat as possible to keep the energy costs low. Also, since a hot brine solution is very corrosive, much care, pretreatment, and special materials need be used so as to avoid excessive maintenance requirements of the equipment.

With respect to systems utilizing the reverse osmosis process, such systems employ delicate membranes and suffer from clogging and deterioration of the membranes. To use such systems in the processing of liquids such as sea water with its relatively high degree of impurities requires specific pretreatment of the sea water. Also, with respect to systems utilizing the freezing process, the process involves the separation of brine from the pure ice product, or a separation of a refrigerant from the pure ice; such separation has yet to be accomplished on a commercial scale.

Thus, it is readily apparent that while systems employing various processes have been implemented for the purification of water and other liquids, such systems have failed to be fully satisfactory. Despite a long felt need and efforts to overcome problems which have beset these systems, such problems persist.

SUMMARY OF THE INVENTION

The aforementioned problems are obviated and other advantages are provided by the system of the present invention for purifying a liquid, the system being particularly adapted for the removal of impurities such as solid matter which has been dissolved in the liquid. It has been discovered that in the practice of the invention advantage can be taken of the phenomenon of reduction in the temperature of the boiling point associated with the reduction in the pressure of the liquid. This characteristic is found, by way of example, in a solution of water containing ionized salts. A well-known extreme case is the so-called "triple point" in the phase state diagram of a saline solution wherein, at an ambient pressure of a few millimeters mercury, the boiling point is reduced to equal the freezing point. At the triple point, three forms of water can exist simultaneously, namely, solid, liquid and vapor. With a still further reduction in temperature and pressure, only the solid (ice) and vapor forms of water are present. The temperature of the triple point of a saline solution is lowered progressively from that of pure water with increasing concentration of the ions of a dissolved salt.

In accordance with the invention, the separation of the liquid from its impurity is accomplished by a process of induced phase change wherein a portion of the liquid spontaneously vaporizes, thereby removing heat from the remaining liquid and impurities which are allowed to be separated from the vapor. The remaining liquid has a much higher concentration of dissolved impurity and, upon the removal of the heat, becomes supercooled or releases pure solid ice leaving a mixture of concentrated brine and ice crystals. The phase change is accomplished by a sudden reduction in pressure as may be attained by passing the impure liquid from a region of higher pressure to a region of lower pressure. The supercooled liquid is at a lower temperature than the vapor and, therefore, may be advantageously utilized within a heat exchanger for condensing the vapor to pure liquid. In a similar manner the mixture of ice and liquid can be blended with an even more concentrated impure liquid, thus causing the ice to melt and the temperature of the blend to lower below that of the vapor, this blend being advantageously utilized within a heat exchanger for condensing the vapor to pure liquid.

The system of the invention comprises a plurality of operatively interacting and interconnected chambers or vessels for performing the foregoing process. The first chamber is at a higher pressure than the other chambers. Typically, the first chamber would be at atmospheric pressure, and the other chambers would have a pressure of a few millimeters of mercury. The first and second of the chambers provide the foregoing regions of higher and lower pressure, the impure liquid passing from the first chamber to the second chamber via an interconnecting orifice or passageway. The second chamber communicates with a third chamber via an open top of the second chamber, and the second chamber communicates with a fourth chamber via an interconnecting orifice or passageway. The fourth chamber contains concentrated brine at a temperature below the triple point for the impure feed solution. Preferably, the fourth chamber is constructed within the third chamber so that the cold outside walls of the fourth chamber can be used for condensing vapor within the third chamber.

The impure feed solution in the first or supply chamber at the higher pressure drips into the second or vaporization chamber at the lower pressure via the interconnecting orifice. This sudden change in pressure induces phase changes in the impure feed solution. Pure vapor is formed and drawn into the third or condensing chamber, and condenses on the outside walls of the fourth or heat exchange chamber. The common walls between the third and fourth chambers act as a heat exchanger and are cooled by the precooled concentrated solution inside the fourth chamber to a temperature sufficiently low to cause condensation of the vapor. The impure feed solution, having lost pure vapor and heat, is now either a supercooled impure liquid or a mixture of concentrated impure liquid and pure solid solvent crystals.

Either the supercooled liquid or the mixture of impure liquid and pure solids passes into the fourth chamber via the interconnecting orifice, and mixes with the cold concentrated solution already in the fourth chamber, thereby lowering its temperature. Concurrently, the heat given up to the concentrated solution in the fourth chamber by the condensing vapor in the third chamber is transferred to the supercooled liquid or the mixture of impure liquid and pure solids, and thereby returns the original concentrated solution in the fourth chamber back to its original temperature. Excess concentrated solution is withdrawn through an opening in the fourth chamber and the condensed pure vapor is withdrawn through an opening in the third chamber.

The invention provides several major advantages. The process utilized by the system is substantially independent of the nature of the feed solutions which are to be purified and, furthermore, requires no special pretreatment of the feed solution. Since the system operates at ambient temperatures and at lower temperatures no energy is consumed in heating the feed and, plastic materials can be used extensively within the system to substantially eliminate corrosion and fouling. Moreover, since the system is under a high vacuum, little air is present so that the combination of low temperature and low oxygen levels substantially decreases corrosion on metals when used. Also, since the process does not require the use of pretreatment chemicals, the use of the system is free of the dangers of environmental pollution associated with the use of such chemicals.

The principles of the invention are most readily demonstrated for the case of an aqueous solution of ionizable salts, such as sea water and brackish water. Accordingly, the preferred embodiment and alternative embodiments will be described with reference to the purification of sea water, it being understood that the disclosed method and apparatus of the system is also operable for the separation of other impurities from other liquids. Further applications of the inventive system include sewage treatment, chemical recovery, liquid concentration, and pollution control.

In the case of the purification of salt water to obtain pure water, the system operates at temperatures extending below zero centigrade, to typically 31.19° C., and at pressures near zero millimeters of mercury. At such low temperature, an opportunity is provided which allows metal to be used for the system, since negligible corrosion occurs as would occur in the high temperature operation of boiling water at standard or elevated pressures. Also, the relatively low temperature permits the use of plastic materials in construction for major components of the system. Preferably the pressure is up to about 3 mm of mercury, typically from about 0.1 mm to about 3.0 mm of mercury. It has been found that highly desirable results are achieved from about 1.5 mm to about 2.5 mm of mercury.

With respect to the construction of the first chamber, a conduit, such as a pipe, can be connected to a reservoir open to atmospheric pressure. A constriction in the conduit, or a suitable valve or pump connected to the conduit meters the rate of flow of the impure liquid into the second chamber, the output of such metering device serving as the aforementioned interconnecting orifice.

If desired, the incoming impure liquid from the reservoir can be premixed in a predetermined ratio with the foregoing concentrated solution prior to presenting the impure liquid at the orifice. The mixing aids in reducing the temperature of the incoming impure liquid and allows reprocessing of previously processed impure liquid for further concentration of and extraction of product. The lower temperature feed makes the process more economical by reducing the amount of excess vapor above that required for equilibrium.

The supercooled liquid can be produced by vaporization of a portion of the liquid from thin films thereof on a set of plates located inside the second chamber. If desired, ice can be obtained by running the saltwater feed mixture down the side walls of the second chamber. In both instances the amount of heat added to the vapor is about equal to the amount of heat removed from the concentrated brine. When the supercooled liquid drains into the fourth chamber it absorbs the heat of the condensing vapor. In the case where ice is formed the ice tends to drive the concentrated salt solution to the freezing point, and in doing so, absorbs the heat of the condensing vapor.

When the impure water is substantially free of salt, if desired, additional quantities of salt may be added to the brine. In both cases of the supercooled liquid, and the brine and ice mixture, auxiliary cooling units and vacuum pumps are provided for initially establishing the operating temperatures and pressures. The cooling units and vacuum pumps can be used intermittently during normal operation if required, such as to compensate for air and thermal leaks.

BRIEF DESCRIPTION OF THE DRAWINGS

The foregoing aspects and other features of the invention are explained in the following description taken in connection with the accompanying drawings wherein.

DESCRIPTION OF THE PREFERRED EMBODIMENTS

Figure 1:
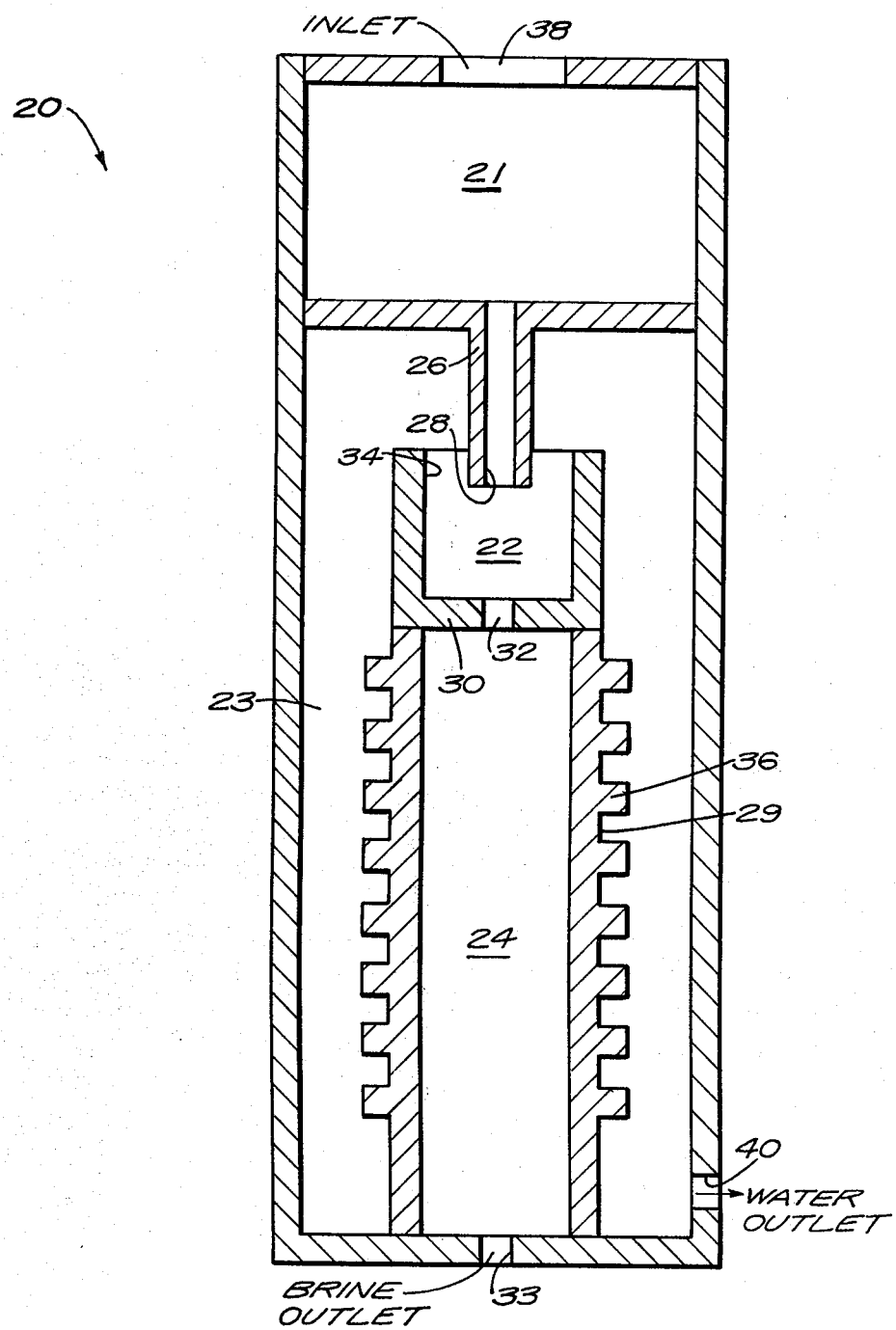
FIG. 1 is a simplified schematic diagram of the basic components of the liquid purification system made in accordance with the invention.

Referring now to FIG. 1, there is shown a schematic representation of a system 20 of the invention for the desalination of sea water. Salts, primarily sodium chloride, constitute the impurities which are to be removed from the sea water. The system 20 provides for the induced phase change of the sea water converting part of it from the liquid phase to the vapor phase. The vapor is free of impurities, and is subsequently condensed to pure water.

The system 20 includes four chamber forming vessels 21-24. The vessel 21 is above vessel 23 and vessels 22 and 24 are within the closed vessel 23 in a superimposed relationship.

A feed comprising sea water, or sea water mixed with concentrated brine, is introduced into the supply or inlet vessel 21. The pressure in vessel 21 is atmospheric and in vessels 22-24 slightly below the triple point for the sea water and brine feed solution. The operation of the system 20 is initiated by filling the fourth or heat exchange vessel 24 with a cold concentrated brine solution near its freezing point and below the saturation temperature of the system.

The sea water feed enters the second or vaporization vessel 22 through a conduit forming orifice 28 under the driving force produced by the difference in pressure between the two vessels 21-22. The conduit forming orifice 28 is open to and depends from the vessel 21 and, because of its relatively small size, the orifice 28 meters the flow of sea water feed mixture into the second vessel 22 at a predetermined rate.

Because the pressure in vessel 22 is below the triple point of the feed solution, pure water vapor is spontaneously generated and drawn off and condensed on the outer surface of walls 29 of the vessel 24, the walls 29 being inside the third or condensing vessel 23. The residual feed now consisting of a mixture of concentrated brine and pure ice is separated by gravity from the vapor and falls into the vessel 22. The vessels 22 and 24 are separated by a barrier 30 having a small central orifice provided by an aperture 32. Because the opening between the vessels 22 and 24, and the surface of the liquid in vessel 24, are small compared with the large heat exchange surface of the walls 29, the vapor preferentially condenses on the walls 29, these walls serving as a condenser in a heat exchanger. The condenser walls, which can be finned or ribbed to increase surface area, form a physical barrier preventing the condensing pure water from uniting with the residual brine and ice mixture to be described, but allowing heat to be transferred from the vapor to melt the ice.

Residual brine and pure ice mixture containing the impurities enters vessel 24 through aperture 32 and is intimately mixed with the aforesaid concentrated brine already contained in the vessel 24. Because of the high salt content of this mixture, its freezing point is below the saturation temperature of the vapor. Heat transferred from the vapor to the brine ice mixture in the vessel 24 via the exchanger walls 29 will melt the ice contained therein maintaining the temperature differential required for condensation.

As a result, the separation of vapor and residue can be accomplished much more reliably and efficiently than is afforded by other types of desalination apparatus. What heat is taken from the feed to form vapor is returned to the feed in cooling the vapor. The residual impure brine is drawn off through port 33 in the common bottom wall of the vessels 23 and 24 while the purified fresh water is drawn off through port 40 extending through the lower portion of the side wall of the vessel 40. Thereby, salt water entering the first vessel 21 of the system 20 becomes fresh water which leaves the system from outlet 40 in the third vessel 23.

Figure 2:
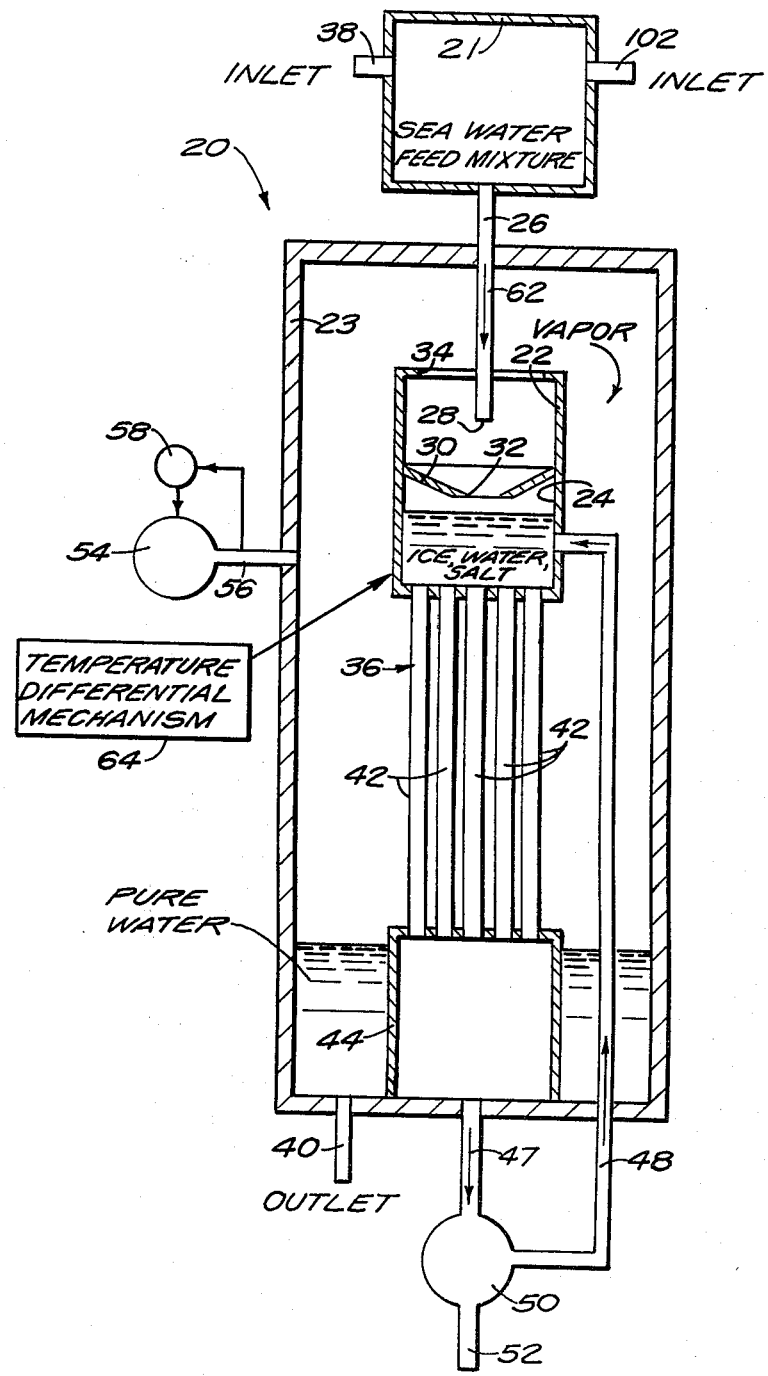
FIG. 2 is a diagrammatic view of the system of FIG. 1 showing a preferred arrangement of the essential components with a temperature differential mechanism.

Referring now to FIG. 2, which illustrates a preferred embodiment of the invention, a condenser 36 is formed of a set of tubes 42 depending from the vessel 24 and about which the water vapor circulates. Cold brine passes from the vessel 24 through the tubes 42 to chill the condenser 36 and remove the heat of vaporization from the water vapor to condense the vapor to liquid water. The lower end of the set of tubes 42 terminates at and opens into a chamber 44 within vessel 23 and in which the brine is collected and recirculated via conduits 47-48 and pump 50. The pump forces the brine via the conduit 47-48 from the chamber 44 back into the vessel 24 for recirculation of the brine. An outlet 52 at the pump 50 permits withdrawal of surplus amounts of the brine.

A partial vacuum is drawn on the vessels 22-24 by a vacuum pump 54 coupled via a conduit 56 to the vessel 23 under control of a pressure sensor 58 coupled between the conduit 56 and the pump 54. The pressure in the vessel 23 is preferably up to about 3.0 mm of mercury, e.g. from about 0.1 mm to about 3.00 mm of mercury. Typical preferred pressures are from about 1.5 mm to about 2.5 mm of mercury. In view of the communication between the second and fourth vessels 22 and 24 via orifice or aperture 32 in the barrier 30, and in view of the communication between the second and third vessels 22 and 23 via opening 34, pressure in vessels 22, 23 and 24 are equal.

In this preferred embodiment of the invention, the conduit or passage 26 takes the form of a length of pipe of sufficiently small diameter to produce viscous drag to the flow of the impure or brackish water, the flow being indicated by an arrow 62. Due to the viscous drag, a back pressure builds up along the passage 26 which counterbalances the difference in pressure between the first vessel 21 and the other vessels 22-24. Equilibrium in the rate of flow of the fluid is established when the flow rate is sufficiently high to provide the compensating back pressure.

As the solution passes through the passage 26 into the reduced pressure region of vessel 22 the temperature of the solution begins to drop and reaches its saturation temperature as determined by the pressure in the vessel 22. This temperature should be lower than the triple point temperature of the sea water feed mixture. In vessel 22 the pure vapor, ice, and brine all co-exist at a temperature determined by the pressure. The coldest temperature is found in the brine in the condenser 36 after passing through a temperature differential mechanism 64. The condenser temperature must be below that of the saturation temperature in vessel 23.

In the vessel 22 the sea water feed spontaneously establishes pure vapor, liquid brine, and ice all at the saturation temperature. The vapor escapes primarily through the opening 34 while a small amount of vapor escapes via aperture 32. The vapor escaping via the upper opening 34 condenses on the outside surfaces of the condenser tubes 42 while the vapor escaping via the lower aperture 32 condenses on the surface of the water in the vessel 24.

The temperature differential mechanism 64, indicated diagrammatically as being operatively connected to the vessel 24, is included within the system 20 for lowering the temperature of the liquid within the vessel 24 to insure the condensation of the vapor in the vessel 23 upon the tubes 42 through which the liquid passes. Different forms of such a mechanism will be described in FIGS. 3-6. The mechanism may be implemented by means of chemical, physical or mechanical processes.

Figure 3:
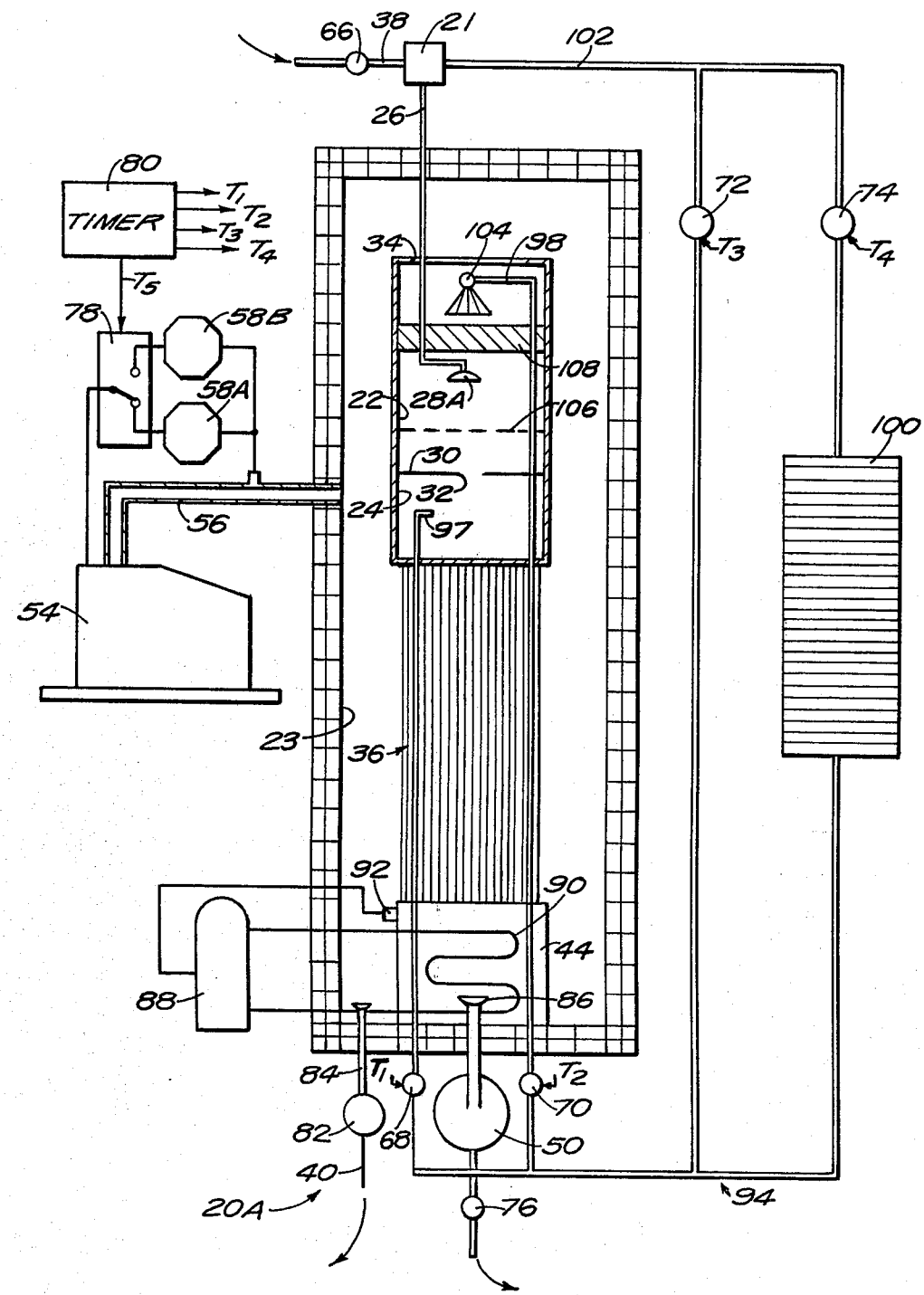
FIG. 3 shows further details of the system of FIG. 2, wherein the temperature differential mechanism employs the phenomenon of freezing point depression.

For example, the chemical process, to be described with reference to FIG. 3, is referred to as freezing point depression which may be explained as follows. The addition of salts or other impurities to a liquid causes its freezing point to be depressed. With respect to the exemplary case of salt water, the freezing point of pure water is 0° C.; however, in a saturated solution of sodium chloride, the freezing point is depressed to $-20°$ C. If ice at 0° C. is added to this saturated salt solution, the ice will melt until ice and saturated salt solution are in equilibrium at $-20°$ C. This phenomenon can be used as a temperature differential mechanism. Referring to FIG. 2, when the sea water feed mixture enters vessel 22, vapor, ice, and brine are formed all at the saturation temperature. Because the brine in vessel 24 is more concentrated than the feed, the brine has a lower freezing point, is cooler than the saturation temperature established, and will remain a liquid. When the ice generated in vessel 22 from the sea water feed mixture passes through aperture 32 and is blended with the concentrated brine in vessel 24, it serves to hold the brine in vessel 24 at its freezing point by melting as heat is added by the vapor condensing on the tubes 42.

The supercooling phenomenon is found under suitable conditions such as the presence of fine sprays or thin films wherein liquids can cool below their normal freezing points. In the case of the water found in clouds, as well as in laboratory experiments, water having a normal freezing point of 0° C. can exist as a liquid at temperatures as low as $-40°$ C. In one embodiment of this invention, to be described with reference to FIG. 4, the supercooling process is to be applied to feed water entering the vessel 22. The resulting reduction in temperature of the feedwater and its addition to the circulating body of residual liquid in the vessel 24 serves as the temperature differential mechanism 64.

With respect to an embodiment for the mechanical implementation of the temperature differential mechanism in sunny climates, a solar panel or pond may be used to raise the temperature of the feed water significantly. It is then possible to set the pressure such that spontaneous separation of the vapor occurs between the temperature of the incoming feed mixture and that of the surrounding atmosphere. Under these conditions a heat exchanger can be used as the temperature differential mechanism 64 and used to transfer heat to the atmospheric air or large body of water as will be described with reference to FIG. 5. Alternatively, as will be described with reference to FIG. 6, a heat transfer coil may be inserted within the chamber 44. A coolant from a mechanical refrigerator or thermoelectric cooling device would then be circulated through the transfer coil to cool down the residual liquid to serve as the temperature differential mechanism 64.

Referring now to FIG. 3, there is shown a system 20A for liquid purification utilizing the process of freezing point depression, the system 20A being obtained by modifying the system 20 of FIG. 2 to accommodate the freezing point depression. The system 20A comprises the vessels 21-24, the condenser 36, and the pumps 50 and 54 which were described in FIG. 2. The system 20A further comprises a feed valve 66, a recirculation valve 68, a wash valve 70, a freeze valve 72, a defrost valve 74 and a drain valve 76. Two pressure sensors 58A-B are coupled via a selector switch 78 to the pump 54 for providing two pressure states within the vessels 22-24. A timer 80 provides timing signals at terminals T1-T5 for controlling respectively the operation of the valves 68, 70, 72, 74 and the switch 78 to which they are connected in a conventional manner. The outlet 40 is coupled by an optional drain pump 82 and pipe 84 to the bottom of the third vessel for pumping out the purified water. The body of residual liquid is drawn off the bottom of the chamber 44 for recirculation by intake pipe 86 and pump 50.

Initial cool-down of the liquid in the system 20A is obtained by a chiller 88 coupled to a cooling coil 90 set within the chamber 44. The chiller 88 is operated in response to a sensing of the liquid temperature by a temperature sensor 92. For the extraction of purified water from sea water, the recirculating liquid is concentrated brine which is cooled down by the chiller 88 to a temperature of approximately 0° F. The output port of the pump 50 is coupled by a conduit system 94 to the valves 68, 70, 72 and 74. Conduits 97-98 coupled respectively to the valves 68 and 70, respectively, bring recirculating brine to the vessels 24 and 22 respectively. A heat exchanger 100 is coupled in conduit system 94 downstream of the valve 74 for heating the residual liquid by withdrawing heat from the outside atmosphere, which generally is warmer than the residual liquid as will be explained subsequently. The valves 72 and 74 are coupled to a second inlet conduit 102 of the vessel 21.

In the second vessel 22, the orifice 28 (FIG. 2) at the lower terminus of the conduit 26 is in the form of an optional nozzle 28A (FIG. 3). Also, a nozzle 104 is provided at the upper end of the conduit 98 for directing recirculating liquid downwardly towards the vessel 24. A grid 106 is placed between the barrier 30 and the nozzle 28A in the vessel 22 to assist in the nucleation of ice crystals. A mist eliminator 108 is placed beneath the opening 34 in the vessel 22 for removing mist from water vapor exiting via the opening 34 to the vessel 23. In addition, the mist eliminator 108 is advantageously located between the nozzles 28A and 104 to facilitate the removal of ice from the eliminator 108, as will be described subsequently.

The operation of the system 20A is readily explained with references to the phase state diagram for water, showing the solid, the liquid and the gaseous states, as a function of temperature and pressure. As noted above, the phase state diagram for water exhibits the triple point. The triple point is dependent on the concentration of the impurity, herein salt, in the water. Since the temperature of the triple point is lowered by the introduction of salt into the water, and drops still further with increasing concentration of the salt, the triple point temperature of the residual liquid in the fourth vessel 24 is lower than that of the liquid in the first vessel 21. Thus, in accordance with a feature of the invention, in the reduced-pressure environment of the second vessel 22, the relatively dilute solution at the nozzle 28A is held below its triple-point temperature, while, in the fourth vessel 24 the more concentrated solution is held above its triple-point temperature. Upon entry of the incoming liquid from the vessel 21 into the vessel 22, spontaneous vaporization of the liquid occurs with a consequent separation of the impurity from the vapor. The vapor passes via the mist eliminator 108 and the opening 34 into the third vessel 23 for condensation at the condenser 36 due to the relatively low temperature of the residual liquid contained therein. The impurities of the sea water feed mixture of the vessel 21, along with ice crystals resulting from the phase change, pass through the grid 106 and the aperture 32 of the barrier 30 into the fourth vessel 24. The dissolving of the impurities in the residual liquid and the melting of the ice in the residual liquid reduce the temperature thereof and, upon passage of the residual liquid from the vessel 24 through the condenser 36, provides the requisite low temperature for condensation of the vapor. Consequently, the dissolving of the impurities and the melting of the ice in the residual liquid provides the function of the temperature differential mechanism 64 of FIG. 2.

Since the temperature and pressure in the third vessel 24 are below the triple point of fresh water, the condensation of the vapor upon the tubes 42 of the condenser 36 results in the buildup of ice along the outer surfaces of the tubes 42. Therefore, in order to produce the pure water, in liquid form as shown in FIG. 2, an additional step is required in the operation of the system 20A providing for the melting of the ice on the tubes 42. Thus, the operation of the system 20A involves the following sequence of steps, namely, the initial step of charging the vessels and conduits with an initial quantity of residual liquid with salt dissolved therein, this being followed by a reduction in temperature by the chiller 88 and then a reduction in pressure by the vacuum pump 54. The reduction in temperature precedes the reduction in pressure so as to avoid any boiling of the brine. Thereafter, the operation of the system 20A continues with a two-step procedure involving the alternating steps of an ice cycle and a defrost cycle. The cycles are implemented by operation of respective ones of the valves 68, 70, 72 and 74. The implementation of the foregoing steps in the operation of the system 20 will now be explained for the case of sea water as the contaminated liquid, it being understood that other contaminated liquids may be processed by the system 20A.

In operation, the sea water is fed into the vessel 21 via the valve 66 and the inlet 38. Residual liquid is also fed into the vessel 21 via the inlet 102. Thereby, the vessel 21 serves as a mixing chamber for mixing together the feed and residual liquids. The pump 50 develops sufficient pressure to force the residual liquid up to the top of the system 20A within the vessel 21 wherein the pressure is approximately at atmospheric pressure. If desired, an additional pump, not shown, may be applied at the inlet to the feed valve 66 for pumping in the feed liquid. Since the pressure at the outlet of the pump 50 is above atmospheric pressure, excess residual liquid is readily forced out through the drain valve 76.

The mixing of the feed and residual liquids in the vessel 21 serves to reduce the temperature of the feed liquid. By way of example, if the residual liquid has a temperature of 0° F. while the sea water feed, in a warm climate is at 80° F., a mixing of 3 parts of sea water to 5 parts of residual liquid will result in a net temperature of this mixture of 30° F. The concentration of typical sea water is approximately 35.8 grams of salt per liter of solution. The residual liquid is a saturated salt solution and would have a concentration of 256.1 grams of salt per liter of solution. Upon mixing them in chamber 21 the resulting triple point would be 25.6° F. at a pressure of approximately 1.9 mm of mercury. By way of example, let the pressure in vessel 22 be set at 1.5 millimeters of mercury. While the sea water and residual liquid mixture is in vessel 21 the mixture is at 30° F. and atmospheric pressure; so it remains in the liquid state. As the liquid advances through the passage 26, the pressure thereof drops to the foregoing value of 1.5 millimeters of mercury. For this mixture, the concentration and the pressure is below the triple point of the mixed liquid at nozzle 28A resulting in the induced phase change of the liquid providing the vapor plus the residual ice crystals and precipitated impurities.

During the ice cycle, the residual liquid is circulated through the condenser 36 and the pump 50 via the freeze valve 72. The initial charge of the brine solution of the residual liquid has a concentration of 2.14 pounds of sodium chloride per gallon of fresh water. The quantity of the initial charge is sufficient to raise the level of residual liquid to approximately the center of the fourth vessel 24; the water level should not rise above the barrier 30. In addition to the foregoing recirculation of residual water via the valves 72, further residual liquid is drawn from the chamber 44 via the intake pipe 86 for transmission by the recirculation valve 68 and the pipe 97 indirectly into the fourth vessel 24. The valves 66 and 72 are adjusted so as to produce the desired mixing ratio while the valve 68 is maintained fully open so as to insure an adequate flow rate in the recirculation of the residual liquid.

Some crystals of the ice adhere to the grid 106 while other crystals of ice fall directly towards the barrier 30. The crystals adhering to the grid 106 facilitate the nucleation of additional ice in the products of the phase change from the nozzle 28A located directly above the grid 106. As the process continues, some ice and brine mixture may splash on the mist eliminator 108, resulting in an accumulation of ice thereon as well as on the grid 106. Since the residual fluid is above its freezing point of −2.5° F., any buildup of ice is readily converted to liquid; and any vapor condensing on a surface cooled by the residual liquid, such as the outer surfaces of the tubes 42, is condensed to ice.

To avoid an excessive buildup of ice on the eliminator 108 and on the grid 106 which would impede the extraction of the vapor from the induced phase change, the excess ice is periodically washed off of the eliminator 108 and the grid 106. The removal of the ice is accomplished by the alternate use of the recirculation valve 68 and the wash valve 70. Periodically, the valve 68 is closed and the valve 70 is opened to direct the residual liquid via the pipe 98 and the nozzle 104 to flow through the mist eliminator 108 and the grid 106 so as to absorb the ice into the residual liquid. In the event that the level of the residual liquid rises too high in the fourth vessel 24, the drain valve 76 is momentarily opened to permit the pump 50 to force out the excess liquid. Thereby, during the ice cycle, any formation of ice on the eliminator 108 and the grid 106 is periodically washed off.

During the freezing of the vapor on the external surfaces of the tubes 42 of the condenser 36, heat passes from the vapor into the recirculating body of the residual liquid. Such heat flow tends to raise the liquid temperature above the original value of 0° F. Since the mixture of ice and brine can only exist in equilibrium at approximately −2.5° F., the ice will melt and drive the temperature down toward −2.5° F. Hence, there is a balance between the warming effect of the condensing vapor and the cooling of the melting ice; the balance causes the circulating body of residual liquid to maintain its original temperature of 0° F.

The defrost cycle is initiated after a buildup of a predetermined amount of ice on the exterior surfaces of the condenser 36. During the defrost cycle, the valves 68 and 72 close, the valve 74 opens, and the selector switch 78 is operated to allow the pressure within the vessels 22-24 to rise between 5 and 6 millimeters of mercury. The timer 80 is preset to provide for periodic operation of the valves 68, 72 and 74 and the switch 78 in accordance with the estimated time of buildup of the ice on the surfaces of the condenser 36. The flow of residual fluid through the valve 72 ceases and the residual fluid passes via the heat exchanger 100 and valve 74 to the vessel 21. The heat exchanger 100 transfers heat from the warmer atmosphere to the recirculating residual liquid to raise the temperature thereof to a value more nearly equal to that of the incoming sea-water feed at the inlet 38. If desired, the feed valve 66 may be closed during the defrost cycle to terminate the flow of the feed liquid during the defrost cycle. The pressure sensors 58A-B are preset at different values of pressure to activate the vacuum pump 54. The sensor 58A is set at the aforementioned exemplary value of 1.5 millimeters of mercury while the sensor 58B is set at a value of pressure that is higher by approximately 5 to 6 millimeters of mercury. Thereby, activation of the switch 78 selects either the higher or lower pressure. The lower pressure is established during the ice cycle, and the higher pressure is established during the defrost cycle.

The relatively warm mixed liquid entering the nozzle 28A flashes off into vapor and cold brine. The vapor condenses on the ice at the surface of the condenser 36 causing the ice to melt. The timer 80 allows sufficient time for most of the ice to melt before reverting to the next ice cycle. During the melting of the ice, purified water builds up in the bottom of the vessel 23 and is pumped out by the pump 82 through the outlet 40. After allowing sufficient time for the withdrawal of the liquid water, the timer 80 transmits timing signals via its terminals T1 and T3-T5 to the corresponding valves 68, 72 and 74 and to the switch 78 to reinstitute the ice cycle.

Figure 4:
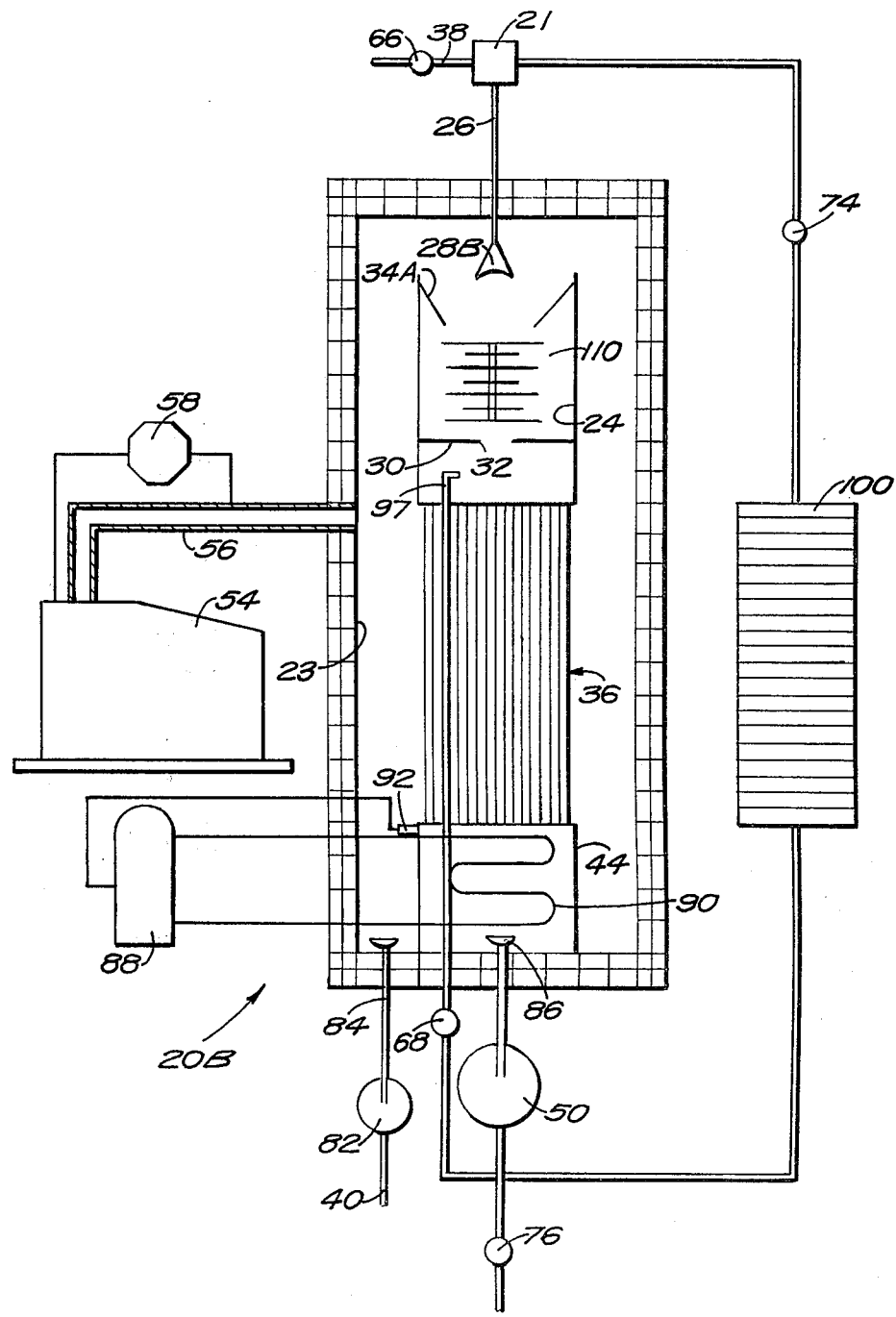
FIG. 4 shows further details of the system of FIG. 2, wherein the temperature differential mechanism employs the phenomenon of supercooling.

Referring now to FIG. 4, there is shown a system 20B which is a further embodiment of the system 20 of FIG. 2 for use with the supercooling process to provide the function of the temperature differential mechanism 64 of FIG. 2. The system 20B includes most of the structural features already described in FIG. 3. The construction of the system 20B is most readily described by comparing it to the system 20A of FIG. 3.

The system 20B includes the vessels 21-24, the pump 50, the chiller 88, the pumps 50 and 82, and the heat exchanger 100 previously seen in FIG. 3. The orifice 28 of FIG. 2 includes a nozzle 28B disposed at the lower end of the passage 26. An opening 34A having inclined sides is disposed at the entrance to the second vessel 22. A set of plates 110 is located within the second vessel 22 between the opening 34A and the barrier 30 for receiving thin films of liquid upon which the supercooling phenomenon can take place. The conduit 98 providing the washing function and the fluid circulation via the valve 72 of FIG. 3 are not included in the system 20B of FIG. 4. The conduit 97 and the recirculation valve 68 coupled thereto function in the same manner in the system 20B (FIG. 4) and the system 20A (FIG. 3).

The operation of the system 20B follows that of the system 20A except for an alternative form of the temperature differential mechanism wherein the supercooling process is utilized in the system 20B of FIG. 4. Residual chilled liquid, the brine, recirculates from the chamber 44 via the pump 50 and the conduit 97 to the fourth vessel 24. The incoming feedwater is mixed in the first vessel 21 in a predetermined ratio with the residual liquid conveyed by the heat exchanger 100. The heat exchanger 100 transfers heat from the environment to the brine so as to provide the optimal temperature for the mixed liquid in the passage 26 for the supercooling of the mixed liquid upon its deposition on the plates 110. For an incoming sea-water feed of a specified salinity and temperature, residual liquid at a specified temperature is mixed with the feed at a specified mixing ratio. The mixed liquid exits the nozzle 28B at a specified for rate to impinge upon the set of plates 110. A partial-vacuum environment is produced by the vacuum pump 50.

Evaporation of the liquid from the plates 110 cools the liquid well below its normal freezing point to a temperature of typically 10° F. The degree of supercooling is a function of cooling rate, water particle size or layer thickness, and concentration. Slower cooling, smaller thickness, and increased impurities all increase the amount by which the water can be supercooled. Vapor formed upon the evaporation of the liquid from the plates 110 passes through the opening 34A into the vessel 23 whereupon the vapor condenses at the condenser 36 to pure liquid water. The liquid water is then drawn off at the outlet 40.

Figure 5:
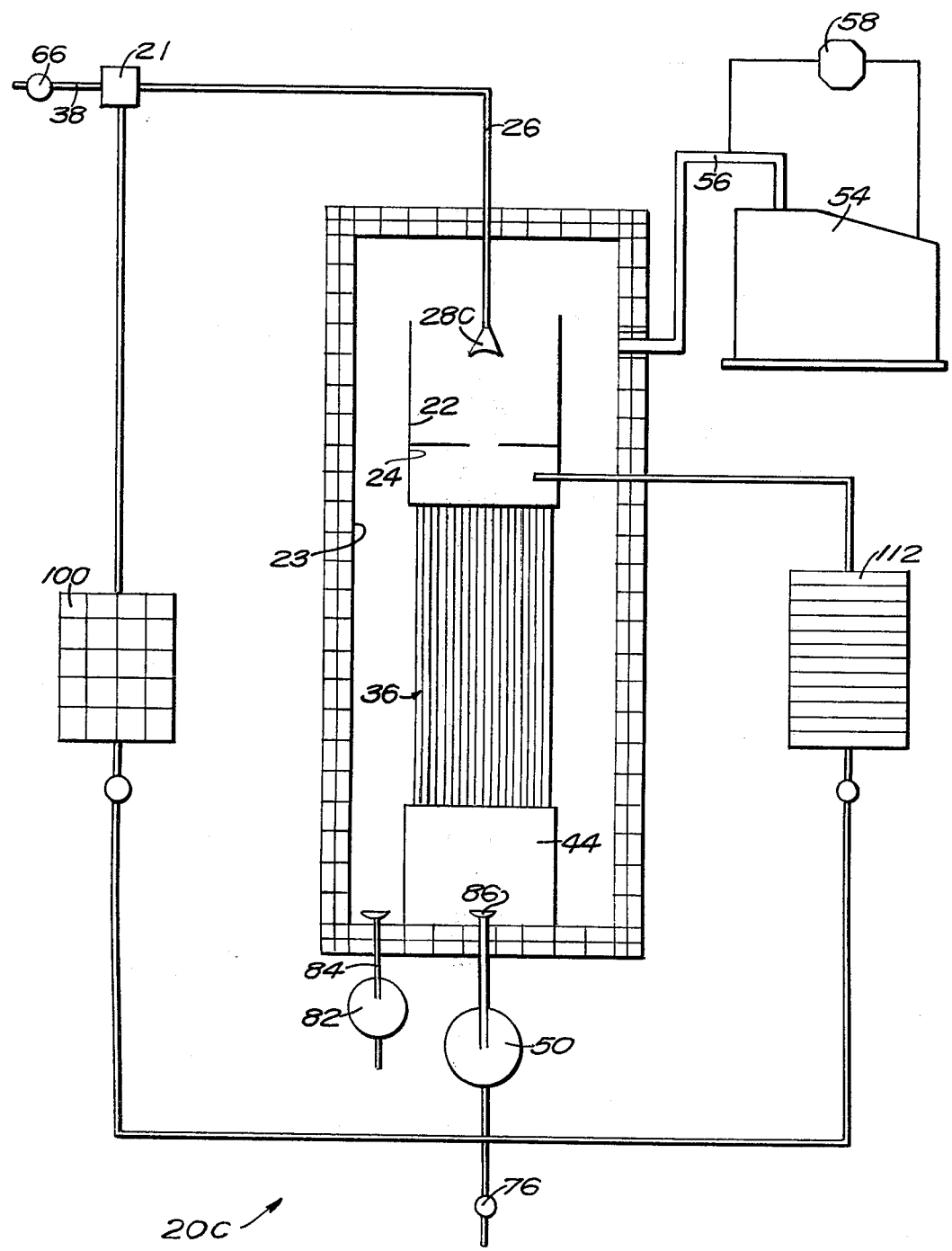
FIG. 5 shows further details of the system of FIG. 2, wherein the temperature differential mechanism employs atmospheric cooling.

Referring now to FIG. 5, there is shown a system 20C which is another embodiment of the system 20 of FIG. 2. The system 20C includes the four vessels 21-24, the vacuum pump 54, the recirculation pump 50, the condenser 36 and the heat exchanger 100 previously seen in FIGS. 3-4. The chiller 88 of FIGS. 3 and 4 is not used in the system 20C of FIG. 5. The system 20C includes an additional heat exchanger 112 to perform the function of the temperature differential mechanism 64 of FIG. 2 in lieu of the processes of freezing point depression (FIG. 3) and supercooling (FIG. 4).

The operation of the system 20C follows that of the system 20B of FIG. 4 in that a portion of residual liquid is passed through the heat exchanger 100 for mixing in the vessel 21 in a predetermined ratio with the incoming feedwater to provide a mixed liquid in the passage 26. The liquid in the passage 26 passes from normal atmospheric pressure in the vessel 21 to a reduced pressure, determined by the operating temperatures of the heat exchangers 100 and 112, in the partial vacuum of the vessel as provided by the vacuum pump 54. By way of example, if the heat exchanger 100 were a solar panel delivering impure water at 60° C. and heat exchanger 112 was operating at an ambient air temperature of 20° C., then the range of pressures would be from 17 to 149 with a typical value of 30 millimeters of mercury. The induced phase change of the impure liquid exiting the nozzle 28C results in liquid with a higher concentration of impurities and of a lower temperature dropping into the fourth vessel 24 while the resulting pure vapor passes into the vessel 23 to be condensed by the condenser 36 into purified liquid. The pump 50 recirculates the residual liquid of the chamber 44 through the heat exchanger 112 to remove whatever heat has been added by the condensing vapor. The concentrations of the liquids in the embodiment of the system 20C need not necessarily be the same as those utilized in the embodiment of the system 20A since no reliance is made upon the process of freezing point depression wherein solid matter, ice, melts within the liquid, water. The system 20C is useful in cold climates wherein the outside temperature may be utilized to withdraw heat from the residual liquid at the heat exchanger 112. The heat exchanger 100, assuming the cold environment, should be placed in an environment of relatively warm air for heating the recirculating liquid to a specified temperature for the mixing operation in the vessel 21. If desired, the heat exchanger 100 may be modified to receive solar energy or waste heat from some other industrial process.

Figure 6:
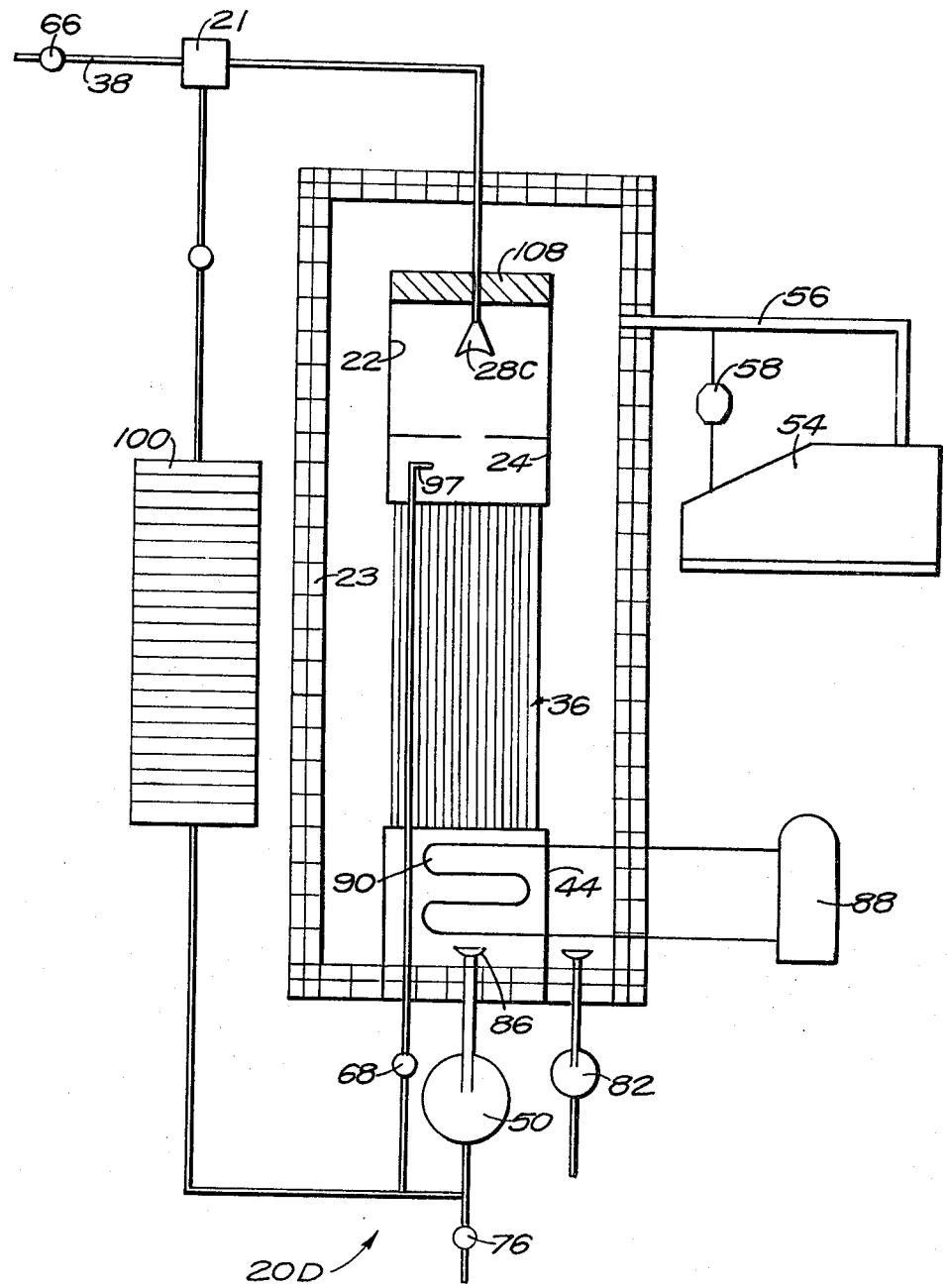
FIG. 6 shows further details of the system of FIG. 2, wherein the temperature differential mechanism employs external refrigeration.

Referring now to FIG. 6, there is shown a system 20D which is yet a further embodiment of the system 20 of FIG. 2. The system 20D comprises the same elements previously disclosed with reference to the system 20C of FIG. 5, except that the heat exchanger 112 has been replaced with the chiller 88. The chiller functions in the same manner as was previously described with reference to the systems 20A and 20B of FIGS. 3 and 4. The chiller 88 reduces the temperature of the residual liquid to the same temperature as was described with reference to the heat exchanger 112 of FIG. 5. If desired, the mist eliminator 108 of FIG. 3 can also be employed in the system 20D. The choice of the systems 20C or 20D is based on ambient environmental temperatures and on the nature of the liquid to be purified. While the freezing depression and supercooling processes are advantageously utilized in the desalination of water, the systems 20C and 20D also can be used for other liquids.

It is to be understood that the above-described embodiments of the invention are illustrative only and that modifications thereof may occur to those skilled in the art. Accordingly, this invention is not to be regarded as limited to the embodiments disclosed herein, but is to be limited only as defined by the appended claims.

What is claimed is:

1. A liquid purification system comprising:
    means for inducing a phase change in a first liquid containing dissolved impurities, wherein said phase change includes a vapor phase essentially free of said impurities, and wherein said vapor phase removes heat from said first liquid and thereby reduces the temperature of the liquid phase thereof,
    heat exchange means which contain a second liquid which is the same as said first liquid but with a greater concentration of said impurities and at a lower temperature, and wherein said heat exchange means and said phase change means have an opening therebetween for conveying the liquid and/or solid phases of said first liquid from said phase changing means into said heat exchange means,
    means operatively connected to said heat exchange means for maintaining the greater concentration of impurities in said second liquid,
    means open to said phase changing means for receiving the vapor free of impurities therefrom which extends to and about said heat exchange means including passage means for conveying the vapor from said opening to said heat exchange means at essentially the same pressure and temperature the vapor is at as it leaves said phase change means,
    said heat exchange means having a relatively large surface area open to said conveying means so that said vapor free of impurities flows into and through said conveying means and into contact with said heat exchange means for condensation thereof as the heat from said vapor is transferred to said second liquid and as the liquid and/or solid phases of said first liquid cool said second liquid within said heat exchange means, and
    pressure means operatively connected to said phase change and vapor conveying means for maintaining the pressure therein at essentially the same level and for reducing said pressure to induce the phase change in the first liquid.

2. A liquid purification system comprising:
    means for supplying a first liquid containing dissolved impurities,
    vaporization means for receiving said first liquid from said supply means and for reducing the temperature thereof,
    metering means connected between said supply and vaporization means for conveying said first liquid from said supply means to said vaporization means at a rate which maintains a pressure differential therebetween,
    means operatively connected to said vaporization means for maintaining a pressure and temperature differential between said supply and said vaporization means with the lower pressure and temperature in said vaporization means being at the triple point of said first liquid, to thereby induce the simultaneous coexistence of the solid, liquid and vapor phases of said liquid, wherein said vapor phase is formed by spontaneous vaporization and removes heat from said liquid, to thereby further reduce the temperature of the solid and liquid phase thereof,
    means operatively connected to said heat exchange means for maintaining the greater concentration of impurities in said second liquid,
    heat exchange means containing a second liquid maintained at a temperature above its triple point which is the same as said first liquid but with a greater concentration of said impurities and a lower temperature, and wherein said heat exchange means is connected to said vaporization means for receiving the liquid and solid phases of said first liquid therefrom, and
    means open to said vaporization means for receiving the vapor free of impurities therefrom which extends to and about said heat exchange means including passage means for conveying the vapor from said opening to said heat exchange means at essentially the same pressure and temperature the vapor is at as it leaves said vaporization means,
    said heat exchange means having a relatively large surface area open to said conveying means so that said vapor free of impurities flows into and through said conveying means and into contact with said heat exchange means for condensation thereof as the heat from said vapor is transferred to said second liquid and as the solid and/or liquid phases of said first liquid cool said second liquid within said heat exchange means, and
    pressure means operatively connected to said vaporization and vapor conveying means for maintaining the pressure therein at essentially the same level wherein said pressure means is adapted to reduce the pressure in said vaporization chamber to the triple point of said first liquid and to allow the pressure in said vapor conveying means to rise for melting any ice on said heat exchange means.

3. A desalination system comprising:
    means for reducing the pressure of salt water to its triple point to induce a phase change in the salt water to simultaneously provide water vapor essentially free of salt, ice essentially free of salt and salt water, wherein said salt water vapor is formed by spontaneous vaporization and removes heat from said salt water to thereby reduce the temperature thereof,
    heat exchange means which contains salt water above its triple point that has a greater concentration of salt and is at a lower temperature than the salt water in said triple point means, and wherein said heat exchange means is connected to said triple point means for receiving ice and salt water therefrom,
    means operatively connected to said heat exchange means for maintaining the greater concentration of salt of the salt water in said heat exchange means,
    means open to said triple point means for receiving the vapor free of impurities therefrom which extends to and about said heat exchange means including passage means for conveying the vapor from said opening to said heat exchange means at essentially the same pressure and temperature the vapor is at as it leaves said triple point means, said heat exchange means having a relatively large surface area open to said conveying means so that said vapor free of impurities flows into and through said conveying means and into contact with said heat exchange means for condensation thereof as the heat from said vapor is transferred to said salt water and as the ice cools said salt water within said heat exchange means, and pressure means operatively connected to said triple point and vapor conveying means for maintaining the pressure therein at essentially the same level and for reducing said pressure of the salt water in said triple point means to its triple point.

4. a desalination system comprising:

means for supplying salt water, vaporization means for receiving said salt water from said supply means and for reducing the temperature thereof, metering means connected between said supply and vaporization means for conveying said salt water from said supply means to said vaporization means at a rate which maintains a pressure differential therebetween, means operatively connected to said vaporization means for maintaining a pressure and temperature differential between said supply and said vaporization means with the lower pressure and temperature in said vaporization means being sufficient to effect the triple point in the salt water to thereby induce it to simultaneously coexist as water vapor, ice and salt water, wherein said water vapor is formed by spontaneous evaporation and is essentially free of salt and removes heat from and thereby reduces the temperature of said salt water, heat exchange means below and connected to said vaporization means containing salt water maintained above its triple point, and with a greater concentration of salt and at a lower temperature than the salt water in said vaporization means, and wherein there is an opening between said vaporization and heat exchange means for conveying by gravity the ice and salt water therefrom, means operatively connected to said heat exchange means for maintaining the greater concentration of salt of the salt water in said heat exchange means, means which are about and open to said vaporization means for receiving the vapor free of impurities therefrom and which extend to and about said heat exchange means including passage means for conveying the vapor from said opening to said heat exchange means at essentially the same pressure and temperature the vapor is at as it leaves said vaporization means, said heat exchange means having a relatively large surface area open to said conveying means so that said vapor free of impurities flows into and through said conveying means and into contact with said heat exchange means for condensation thereof as the heat from said vapor is transferred to said salt water and as the ice melts and cools said salt water within said heat exchange means, and pressure means operatively connected to said vaporization and vapor conveying means for maintaining the pressure therein at essentially the same level and for reducing said pressure to the triple point of the salt water to its triple point.

5. A desalination system comprising:

means for supplying salt water at about ambient air pressure, vaporization means for receiving said salt water from said supply means and for reducing the temperature thereof, metering means connected between said supply means and said vaporization means for conveying salt water from said supply means to said vaporization means at a rate which maintains the pressure differential therebetween, means operatively connected to said vaporization means for maintaining the pressure and temperature differential between said supply means and said vaporization means with the lower pressure and temperature in said vaporization means reducing the salt water to its triple point to induce the salt water therein to simultaneously coexist as water vapor, ice and salt water, wherein said water vapor is essentially free of salt and removes heat from said salt water and thereby reduces the temperature thereof, heat exchange means containing salt water as a brine, having a greater concentration of salt than the water of said supply means, and which brine is maintained at a lower temperature than the salt water in said vaporization means, said heat exchange means being connected to said vaporization means for receiving the ice and salt therefrom, and having temperature means for reducing the temperature of the brine thereof to a value below about 0° C., means operatively connected to said heat exchange means for maintaining the greater concentration of salt of the salt water in said heat exchange means, closed outer means within which are said vaporization and heat exchange means wherein said vaporization means open into said space, and wherein said closed outer means includes passage means for conveying the vapor from said opening to said heat exchange means at essentially the same pressure and temperature the vapor is at as it leaves said vaporization means, said heat exchange means having a relatively large surface area so that said vapor free of impurities flows through said passage means and into contact with said heat exchange means for condensation thereof as the heat from said vapor is transferred to said salt water and as ice cools said salt water within said heat exchange means, wherein said heat exchange means further comprises means for recirculating brine therethrough for conveying heat from the condensing vapor to melt the ice and thereby retain the relatively low temperature of the brine, and wherein said metering means further comprises mixing means connected to said heat exchange means for mixing said brine with the salt water of said supply means to lower the temperature of said salt water and reduce its triple point, and pressure means operatively connected to said vaporization and closed outer means for maintaining the pressure therein at essentially the same level wherein said pressure means is adapted to reduce the pressure of the salt water in said vaporization means to about 0.10 mm to about 3 mm of mercury and to allow the pressure in said closed outer means to rise for melting any ice on said heat exchange means.

6. A system according to claim 5 wherein said mixing means includes heating means for heating the brine to generate vapor to defrost the system.

7. A system according to claim 5 further comprising means connected between said vaporization means and said heat exchange means for washing away ice formed within said vaporization means with brine from said heat exchange means.

8. A liquid purification system comprising:
a vaporization chamber for receiving liquid with impurities wherein the liquid is induced to reach its triple point whereat vapor essentially free of impurities, solid essentially free of impurities and liquid with impurities coexist,
heat exchange means connected to said vaporization chamber which contains the same liquid with a greater concentration of impurities and at a lower temperature than the liquid in said vaporization chamber and which receives solids and liquid from said vaporization chamber as vapor is formed,
means operatively connected to said heat exchange means for maintaining the greater concentration of impurities in said second liquid,
condensing means open to said vaporization chamber and about said heat exchange means including passage means for conveying the vapor from said opening to said heat exchange means at essentially the same pressure and temperature the vapor is at as it leaves said vaporization means,
said heat exchange means having a relatively large surface open to said condensing means so that the vapor free of impurities flows from said vaporization chamber through said passage means and into contact with said heat exchange means for condensation thereof as the heat from said vapor is transferred to the liquid and the solids and liquid cool the liquid within said heat exchange means, and
pressure means operatively connected to said vaporization chamber and condensing means for maintaining the pressure therein at essentially the same level and for reducing said pressure to the point where the liquid in said vaporization chamber coexists as vapor, solid and liquid.

9. A desalination system comprising:
a vaporization chamber for receiving salt water wherein the salt water is induced to reach its triple point whereat water vapor essentially free of salt, ice essentially free of salt and salt water coexist,
heat exchange means connected to said vaporization chamber which contains salt water above its triple point that has a greater concentration of salt and is at a lower temperature than the salt water in said vaporization chamber and which receives ice and salt water from said vaporization chamber as vapor is formed,
means operatively connected to said heat exchange means for maintaining the greater concentration of salt of the salt water in said heat exchange means,
condensing means open to said vaporization chamber and about said heat exchange means including passage means for conveying the vapor from said opening to said heat exchange means at essentially the same pressure and temperature the vapor is at as it leaves said vaporization chamber,
said heat exchange means having a relatively large surface open to said condensing means so that the vapor free of salt flows from said vaporization chamber through said passage means and into contact with said heat exchange means for condensation thereof as the heat from said vapor is transferred to the salt water and the ice cools the salt water within said heat exchange means, and
pressure means operatively connected to said vaporization chamber and condensing means for maintaining the pressure therein at essentially the same level and adapted to reduce said pressure to the triple point of the salt water in said vaporization chamber to induce the coexistence of the vapor, ice and salt water therein.

10. The desalination system of claim 9, wherein said pressure means is adapted to allow the pressure to rise in said condensing means whereupon the temperature of the vapor rises and flows through said vaporization chamber through said passage means and melts any ice on said heat exchange means as heat from said vapor is transferred to the ice.

11. A desalination system comprising:
an upper inner chamber for receiving salt water wherein the salt water is induced to reach its triple point whereat water vapor essentially free of salt, ice essentially free of salt and salt water coexist,
heat exchange means below said inner chamber connected to said inner chamber for containing salt water above its triple point that has a greater concentration of salt and is at a lower temperature than the salt water in said inner chamber, and wherein said heat exchange means is open to said inner chamber for receiving ice and salt water therefrom as vapor is formed,
means operatively connected to said heat exchange means for maintaining the greater concentration of salt of the salt water in said heat exchange means,
an outer condensing chamber about said inner chamber and heat exchange means which is open to said inner chamber and which surrounds said heat exchange means and includes a passage for conveying the vapor from said opening to said heat exchange means at essentially the same pressure and temperature the vapor is at as it leaves said inner chamber,
said heat exchange means having a relatively large surface open to said outer condensing chamber so that the vapor free of impurities flows from said inner chamber into said outer chamber and through said passage and into contact with said heat exchange means for condensation thereof as the heat from said vapor is transferred to the salt water and the ice cools the salt water within said heat exchange means,
pressure means operatively connected to said chambers for maintaining the pressure therein at essentially the same level wherein said pressure means is adapted to reduce the pressure in said vaporization chamber to the triple point of the salt water to induce the coexistence of the vapor, ice and salt water therein and to allow the pressure in said condensation chamber to rise for melting any ice on said heat exchange means, and
means for withdrawing the water from said condensation chamber.

* * * * *